Jan. 12, 1960  W. MITCHELL  2,920,411
EXPANSILE RUG
Filed May 16, 1958

INVENTOR.
WILLIAM MITCHELL
BY Frank Malvera
ATTORNEY

United States Patent Office 2,920,411
Patented Jan. 12, 1960

2,920,411
EXPANSILE RUG

William Mitchell, New York, N.Y., assignor to Mitchell Accessories, Inc., New York, N.Y., a corporation of New York Application May 16, 1958, Serial No. 735,815

2 Claims. (Cl. 41—10)

This invention relates to an expansile rug.

Rugs made of fur bearing animals are provided with large heads generally stuffed with suitable material, for example, sawdust.

Such rugs are not washable in a washing machine since the sawdust would be released upon breaking of the retaining stitches.

It is an object of this invention to provide an expandible animal rug.

It is another object to provide a washable animal rug having a life-like appearance.

It is a further object to provide an inexpensive animal rug made from synthetic fur.

These and other objects of this invention will become apparent upon reading the following descriptive disclosure taken in conjunction with the drawing in which.

Figure 1:
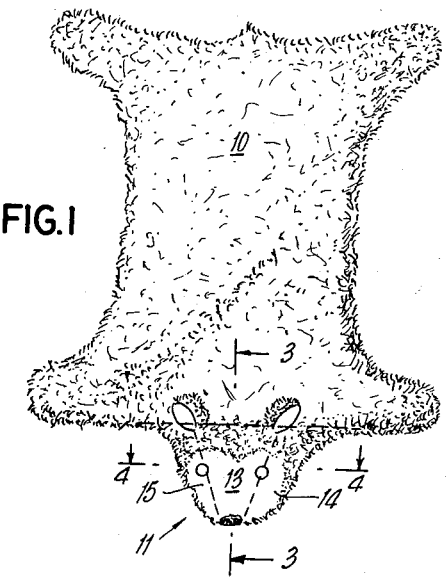
Fig. 1 is a top plan view of the rug made from synthetic fur.

The animal rugs of this invention are made from synthetic fur, for example, Orlon pile on a simulated leather backing sheet. Such backing sheet material, generally made from plastic material, is resilient and flexible and yet relatively rigid.

Turning to the drawing, an animal rug in the form of a bear-skin is provided with a body portion 10 and a head 11. The body portion consists of an integral sheet of fur material cut into the shape of the body portion of a bear.

The important features of this invention reside in the construction of the head 11.

Figure 2:
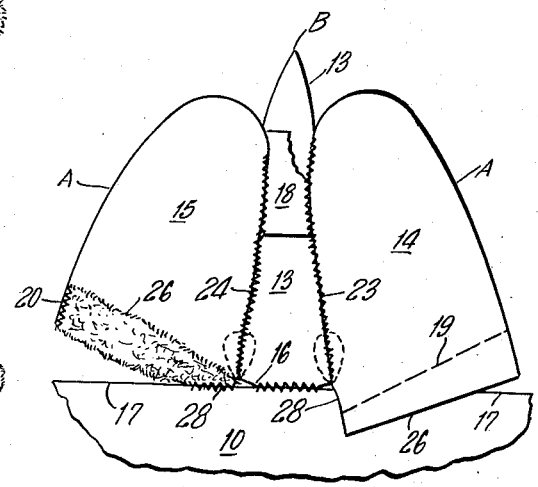
Fig. 2 is an inside view of the animal head, exfoliated in part along cut seam lines to show the manner of inner construction of the head.

As shown in Fig. 2 the head consists of a plurality of separate pieces sewn together along seam lines. The head of Fig. 2 consists of a snout 13 and a right jowl 14 and a left jowl 15 (Fig. 1).

The jowls 14 and 15 are generally mitten shaped and are mirror images of one another. The snout 13 is generally triangular shaped being provided with a curved base line 16 to create an elevated or gathered effect when sewn to the straight edge 17 of the body portion 10.

A feature of this invention is the provision of bulk or depth to the animal head by the use of a gusset 18 suitably disposed beneath and secured to the snout 13. The gusset 18 is preferably a truncated triangular piece, and preferably of the simulated fur material.

As shown in Fig. 2 the respective jowls 14 and 15 are sewn to the long edges of the snout 13 and the gusset 18 is sewn to the seam edges of the snout 13. Preferably the gusset 18, the respective jowl and the snout is sewn together in one seaming operation.

As also shown in Fig. 2, the jowls are made extra long so that a suitable portion of the bottom section may be folded over along a fold line 19. The folded material is then sewn at the outer edge of the respective jowl at seam line 20 giving an inwardly folded portion 21 of jowl 15. The inwardly folded portions 21 of each respective jowl 14 and 15 give bulk and cushion to the ear of the animal head whereas the gusset 18 gives bulk and cushion to the nose portion of the animal head. The over-all effect is that the animal head is provided with a life-like three dimensional appearance without the use of stuffing material, for example, rags or mill waste. Thus the rugs are washable in conventional washing machines.

A suitable ear 22 is sewn into the head along each of the seam lines 23 and 24 uniting respectively jowls 14 and 15 to the snout 13.

The ears 22 are provided with a V-notched edged portion 25 to provide suitable rigidity to the base of the ear thereby causing them to stand erect on the animal head. In securing the ears 22 to the head 11 the V-notch of each ear is sewn together and the ear is then sewn into the respective seam line 23 or 24. Preferably the respective ears 22 are sewn into the respective seam lines 23 and 24 in one sewing operation.

Figure 3:
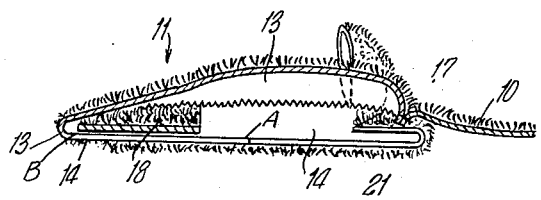
Fig. 3 is a section view of the head taken on line 3—3 of Fig. 1.
Figure 5:
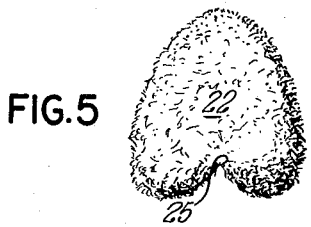
Fig. 5 is a plan view of an ear.
Figure 6:
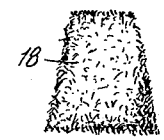
Fig. 6 is a plan view of the gusset used to give depth to the animal head forward of the ears.
Figure 4:
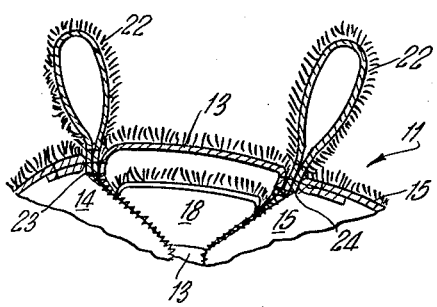
Fig. 4 is a section view taken on line 4—4 of Fig. 1.

After the jowls 14 and 15 have been sewn to the snout 12 along the respective long snout edges, the jowls 14 and 15 are themselves sewn together to points A shown in Fig. 2. Thus as shown in Fig. 3, the sewn together jowls form a pocket only to point A. Thus in washing a rug having a head 11 no great amount of water is momentarily trapped in head 11. After the head is formed by sewing the jowls 14 and 15 to snout 13 including the gusset 18 and the ears 22, the head 11 still in its turned inside out position used for seaming, is then secured to the body 10 along the body neckline edge 17. To accomplish a bunched up or gathered effect for the neck the curved snout edge 16 is suitably sewn to the neckline 17.

As shown in Figure 2, the fold line 19 is preferably not parallel to the edge 26 of a respective jowl. Thus edge segment 27 of jowl 14 is about twice the length of segment 28. In other words two edge segments 28 are equal in length to one edge segment 27.

The folded over material adjacent each segment 28 are sewn together and to neck line 17 exteriorly of seam line 16 thereby giving bulk to the back of the head causing it to be suitably elevated above the nose end of head 11.

This invention has been described by means of an illustrative embodiment but its features of a gusset and of folded over jowl ends to give bulk to a flatly disposed animal head may be varied within the skill of the art without departing from the invention. Thus larger or smaller gussets may be used. Also two or more superimposed gussets may be used. And gussets of suitable bulk for example of sponge rubber or sponge plastic material of suitable thickness are operable.

I claim:

1. A floor rug comprising a fur flat body portion having the configuration of an animal skin and a three dimensional fur head secured thereto by stitches, said head consisting of two jowl longitudinal pieces having a round front edge and an opposed straight rear edge; a longitudinal snout piece having a triangular front edge and a slightly curved rear edge stitched to said body portion, a jowl longitudinal edge of each jowl being respectively stitched to a longitudinal edge of said snout piece with the respective round edge of said jowls being stitched to the respective edge of the triangular portion of said snout piece to form a hollow head with the animal fur on the outside; and a truncated bulky triangular resilient gore piece suitably stitched interiorly between said snout and jowls below the triangular portion of the snout to form a resilient pad disposed in the nose of the head, whereby release of stepping pressure on said nose of said head causes said nose to immediately return to its three dimensional configuration.

2. The rug of claim 1 wherein the jowl pieces are longer than the snout piece and the extra length of each jowl is folded over inwardly to contact the rear edge of the snout, said folded over jowl portions being stitched to the body portion adjacent to and on opposite sides of the jowl stitching to the body portion thereby forming a resilient fur ledge disposed within said hollow head adjacent the back of the head whereby release of stepping pressure disposed on the rear of said head immediately returns the back of the head to its original three dimensional configuration.

References Cited in the file of this patent

UNITED STATES PATENTS

| | | |
|---|---|---|
| 2,705,803 | Sheldrick et al. | Apr. 12, 1955 |
| 2,727,242 | Pascal | Dec. 20, 1955 |